United States Patent
Somani et al.

(10) Patent No.: US 9,130,935 B2
(45) Date of Patent: Sep. 8, 2015

(54) SYSTEM AND METHOD FOR PROVIDING ACCESS CREDENTIALS

(75) Inventors: Haniff Somani, Mercer Island, WA (US); Sean Michael Quinlan, Duvall, WA (US)

(73) Assignee: GOOD TECHNOLOGY CORPORATION, Dover, DE (US)

( * ) Notice: Subject to any disclaimer, the term of this patent is extended or adjusted under 35 U.S.C. 154(b) by 321 days.

(21) Appl. No.: 13/101,962

(22) Filed: May 5, 2011

(65) Prior Publication Data

US 2012/0284786 A1    Nov. 8, 2012

(51) Int. Cl.
H04L 9/32        (2006.01)
H04L 29/06       (2006.01)

(52) U.S. Cl.
CPC ........ H04L 63/0884 (2013.01); H04L 63/0815 (2013.01); *H04L 63/0281* (2013.01); *H04L 2463/082* (2013.01)

(58) Field of Classification Search
CPC ............ H04L 63/0281; H04L 63/0884; H04L 63/0815; H04L 2463/082
USPC ....................................... 726/7, 12
See application file for complete search history.

(56) References Cited

U.S. PATENT DOCUMENTS

| | | | | |
|---|---|---|---|---|
| 6,606,663 | B1 * | 8/2003 | Liao et al. ...................... | 709/229 |
| 6,836,474 | B1 * | 12/2004 | Larsson et al. ................. | 370/338 |
| 6,947,404 | B1 * | 9/2005 | Zalka ............................. | 370/338 |
| 8,533,457 | B2 * | 9/2013 | VanHeyningen et al. ...... | 713/153 |
| 2002/0194292 | A1 * | 12/2002 | King .............................. | 709/213 |
| 2003/0126230 | A1 * | 7/2003 | Donatelli et al. .............. | 709/217 |
| 2004/0123159 | A1 * | 6/2004 | Kerstens et al. ............... | 713/202 |
| 2005/0015490 | A1 | 1/2005 | Saare et al. | |
| 2005/0015604 | A1 * | 1/2005 | Sundararajan et al. ........ | 713/184 |
| 2005/0108574 | A1 * | 5/2005 | Haenel et al. .................. | 713/201 |

(Continued)

FOREIGN PATENT DOCUMENTS

EP          0 991 242 A2     4/2000
WO    WO 2007/068716 A1    6/2007

OTHER PUBLICATIONS

"P-Synch Installation and Configuration Guide" Software Revision 6.2, Last changed May 22, 2003 © 2004 M-Tech Information Technology (817 pages).*

(Continued)

*Primary Examiner* — Joseph P Hirl
*Assistant Examiner* — Thomas Gyorfi
(74) *Attorney, Agent, or Firm* — EIP US LLP

(57) ABSTRACT

Embodiments of the invention are concerned with providing access credentials associated with a user of a service to a server hosting the service, e.g. enabling single sign on by the user to a number of servers.

The embodiments include functionality for establishing a first data connection with a terminal associated with the user and a second data connection with the server, and bridging the first and second data connections in order to establish a first communications session, using a first communications protocol, between the terminal and the server. A second communications session, using a second communications protocol, is also established with the server, via which a request for access credentials associated with the user is received. This request includes information received by the server in the first communications session, which is used to identify access credentials of the user that are transmitted to the server via the second communications session.

23 Claims, 5 Drawing Sheets

(56) References Cited

U.S. PATENT DOCUMENTS

| | | | |
|---|---|---|---|
| 2009/0199289 A1* | 8/2009 | Davis | 726/12 |
| 2009/0328178 A1 | 12/2009 | McDaniel et al. | |
| 2010/0138501 A1 | 6/2010 | Clinton et al. | |
| 2010/0227632 A1 | 9/2010 | Bell et al. | |
| 2010/0325420 A1* | 12/2010 | Kanekar | 713/151 |

OTHER PUBLICATIONS

R. Fielding et al. "RFC 2068: Hypertext Transfer Protocol—HTTP/1.1" Published Jan. 1997 (162 pages) http://tools.ietf.org/pdf/rfc2068.pdf.*

Paul Schweitzer. "W@P: Wireless Application Protocol" Published Mar. 28, 2000 (13 pages) http://www.csc.villanova.edu/~pschweit/csc8530/wap-for-class.html.*

Andreas Pashalidis and Chris J. Mitchell, A Taxonomy of Single Sign-On Systems, ACISP 2003, LNCS 2727, 2003, pp. 249-264.

Andreas Pashalidis and Chris J. Mitchell, Single Sign-On using Trusted Platforms, Royal Holloway, University of London, United Kingdom, pp. 1-15.

Michael Grundmann, Erhard Pointl, Single Sign-On: Reviewing the Field, Johannes Kepler University Linz, pp. 1-9.

CAS Protocol, http://www.jasig.org/cas/protocol, Release date: May 4, 2005, Yale University.

Kerberos (protocol), http://en.Wikipedia.org/wiki/Kerberos, as accessed May 5, 2011.

OAuth Core 1.0, http://oauth.net/core/1.0, dated Dec. 4, 2007.

Paul Bourdeaux, Exploring Android Cloud to Device Messaging (C2DM), Sundog Blog, http://sundog.net/e/3718, dated May 28, 2010, accessed Feb. 3, 2011.

Android Cloud to Device Messaging Framework, http://code.google.com/android/c2dm/index.html, accessed Jan. 13, 2011.

Local and Push Notification Programming Guide, http://developer.apple.com/library/.../ApplePushService.html, dated Aug. 3, 2010, accessed Aug. 23, 2010.

Mobisynth, Understanding Apple push Notifications (iPhone), http://mbiynth.wordpress.com/2009/11/29/understanding-apple-push-notifications-iphone/, dated Nov. 29, 2009, accessed Aug. 16, 2010.

Yochay, Understanding How Microsoft Push Notification Works—Part 2, The Windows Phone Developer Blog, http://windowsteamblog.com, dated May 4, 2010, accessed Aug. 9, 2010.

International Search Report and Written Opinion mailed Jul. 27, 2012, for International Application No. PCT/US2012/036175.

* cited by examiner

SYSTEM AND METHOD FOR PROVIDING ACCESS CREDENTIALS

The present is related to U.S. patent application Ser. No. 13/025,984 entitled Method, apparatus and system for provisioning a push notification session filed on Feb. 11, 2011, hereby incorporated herein by reference in its entirety.

FIELD OF THE INVENTION

The present invention relates to a system and method of providing access credentials associated with a user of a service to a server hosting the service.

More particularly, but not exclusively, the present invention relates to a method of establishing a first communications session between a terminal associated with a user and a server hosting a service, where the first communications session is established via a proxy server that provides access credentials associated with the user of the terminal to the server. The present invention may be used to allow single sign on for the user of the terminal, in that the user may be granted access to respective services provided by a plurality of servers without being repeatedly prompted to enter access credentials.

BACKGROUND OF THE INVENTION

Single sign on systems are known where a proxy server may be configured to provide access credentials to servers on behalf of a user using a terminal. The terminal may first connect to the proxy server so that it may transmit authentication information to the proxy server, thereby authenticating the user to the proxy server. Once the user has been authenticated, the proxy server may connect to a server, indicate to the server that the user has been authenticated, and then act as a proxy in a communications session between the terminal and the server.

Such single sign on systems require the proxy server to receive authentication information from the terminal and transmit an indication of authentication of the user to the server using the connections that form the proxied communications session between the terminal and the server. The proxied communications session may thus be required to use a communications protocol known to the proxy server, and communication between the terminal and server via the proxied connection may be restricted to communication using this communications protocol.

The present invention aims to provide an improved system and method of providing access credentials associated with a user of a service to a server hosting the service.

SUMMARY OF THE INVENTION

In accordance with one aspect of the disclosure, there is provided a method of providing access credentials associated with a user of a service to a server hosting the service according to the appended claims. Preferred features of the method are set out in the dependent claims.

The embodiments described herein are concerned with providing a method of providing access credentials associated with a user of a service to a server hosting the service, the method comprising:

establishing a first data connection with a terminal associated with the user on the basis of authentication credentials held for the user of the terminal;

in response to establishing said first data connection, establishing a second data connection with the server, and bridging the first and second data connections in order to establish a first communications session between the terminal and the server, said first communications session using a first communications protocol;

establishing a second communications session with the server, said second communications session using a second communications protocol, and receiving from the server via the second communications session a request for access credentials associated with the user, said request comprising information received by said server in said first communications session, and identifying said access credentials on the basis of said information, and transmitting said access credentials to the server via the second communications session.

In embodiments of the invention the first communications protocol is different than the second communications protocol. Accordingly, by allowing the terminal and server to communicate in the first communications session via a first communications protocol, and using a second communications session to convey access credentials to the server via a second communications protocol, this embodiment ensures that the first communications session may be conducted according to the first communications protocol without interruption by the party that acts so as to bridge the first and second data connections. This party may be a proxy server that is configured to proxy the first and second data connections.

The first communications protocol used by the terminal and server may be any communications protocol chosen by the end points (terminal and server) of the first communications session. In one embodiment the information in said request for access credentials sent by the server to the party bridging the first and second data connections includes authentication credentials associated with the user, these having been received by the server from the terminal in the first communications session. The embodiment may then include the party bridging the first and second data connections verifying said received authentication credentials using authentication credentials held locally by the bridging party for the user of the terminal, and, dependent upon the verification, identifying said access credentials.

By verifying the received authentication credentials using the authentication credentials held for the user of the terminal, this enables the party bridging the data connections to identify the user of the terminal, and thence retrieve access credentials for transmission to the server.

More specifically, the authentication credentials received from the server in said request may include a message authentication code generated using said authentication credentials held locally on the terminal for the user of the terminal, and the information in said request for access credentials may include a user identifier. The user identifier is sent to the bridging party (e.g. proxy server) which, using said authentication credentials held for the user of the terminal, verifies the message authentication code in said received authentication credentials, and in response to the verification of said message authentication code, identifies access credentials associated with said user identifier.

In this arrangement, the message authentication code is first verified, using corresponding authentication credentials accessible to the proxy server, and, once verified, the user identifier is used to retrieve the relevant access credentials.

In another example an access token is transmitted from the terminal to the server, where the access token contains information identifying the user of the terminal (such as a username), and information identifying the server. In this example the access token contains the above mentioned message authentication code, where this message authentication code is keyed using a secret key in the authentication credentials of the user of the terminal. The message authentication code may be a hash of the other contents of the access token (besides the message authentication code itself), where the key of the hash is comprised of a secret key in the authentication credentials of the user of the terminal.

In another embodiment the information in said request for access credentials includes a data connection identifier identifying one of said first and second data connections. The data connection identifier is sent to the bridging party (e.g. the proxy server), which, in conjunction with bridging the first and second data connections, stores an association between the first and second data connections; thereafter, and in response to receiving said data connection identifier in said request for access credentials, the proxy server retrieves said stored association in order to determine the authentication credentials held for the user of the terminal and that were used to establish said first data connection, and identifies said access credentials on the basis of said authentication credentials.

By storing an association between the first and second data connections and receiving a data connection identifier from the server in said request for access credentials, the access credentials can be identified by the bridging party on the basis of the association between the data connections, and without the need for transmission of authentication credentials in the first communications session. In this embodiment the data connection identifier may for example identify a communications port of the second data connection that is used by the party that acts so as to bridge the first and second data connections.

Preferably, encrypted authentication credentials to be used in establishing said first data connection are stored at the terminal. These encrypted authentication credentials may be encrypted using a user password which can be changed at one or more of a plurality of other terminals associated with the user of said terminal as part of a password change process. In one arrangement this password change process may include:

receiving a hash of a new password entered at the terminal;
identifying a plurality of other terminals associated with the user of said terminal;
transmitting a hash of said new password to said plurality of other terminals, and
using said hash of said new password at said plurality of other terminals to encrypt authentication credentials to be used in establishing respective first data connections for said other terminals.

These steps may be performed by a said server with which the terminal communicates according to the above method, and which, for example, is configured to provide a password change service. Accordingly, access to the password change service is preferably provided via said first and second communications sessions by the bridging party; once the terminal has transmitted a hash of the new password to the server, the server can transmit the hash of the new password to those terminals identified to be associated with the user.

This therefore ensures that each of the terminals with which the user is associated may be configured to use the same new password to encrypt the authentication credentials stored for the user at each terminal.

Thus this embodiment ensures that the user password for a given user is the same on all terminals associated with that user, even when the user password is changed at one of the terminals. As a result anyone who may have gained knowledge of the old user password on any of the terminals associated with the user will no longer be able to access the services of a server after the user password is changed at any of the terminals associated with the user.

In accordance with other aspects of the invention, computer programs in the form of sets of instructions to be executed by computing devices may be provided, these corresponding to the aforementioned methods. Further, a terminal may be configured with computer programs to realise embodiments of the invention, while a proxy server may be configured with computer programs to facilitate establishment of the first and second data connections, bridging thereof, and said identification of access credentials for transmission to the server.

Further features and advantages of embodiments of the invention will become apparent from the following description of preferred embodiments of the invention, given by way of example only, which is made with reference to the accompanying drawings.

DETAILED DESCRIPTION OF THE INVENTION

Embodiments of the present invention relate to a system and method of providing access credentials associated with a user of a service to a server hosting the service. Embodiments may for example be used to allow a plurality of servers, each hosting a respective service, to be provided with access credentials associated with a user of those respective services without requiring the user to be prompted for these credentials. This allows a user to be authenticated to a plurality of servers without the user needing to repeatedly enter authentication information, thus enabling a single sign on scheme. Each server may provide a service that is specific to the user of the terminal identified by the access credentials provided to the server for that user, for example a server may provide access to files, emails, calendar entries, and/or other information and/or services specific to that user.

Figure 1:
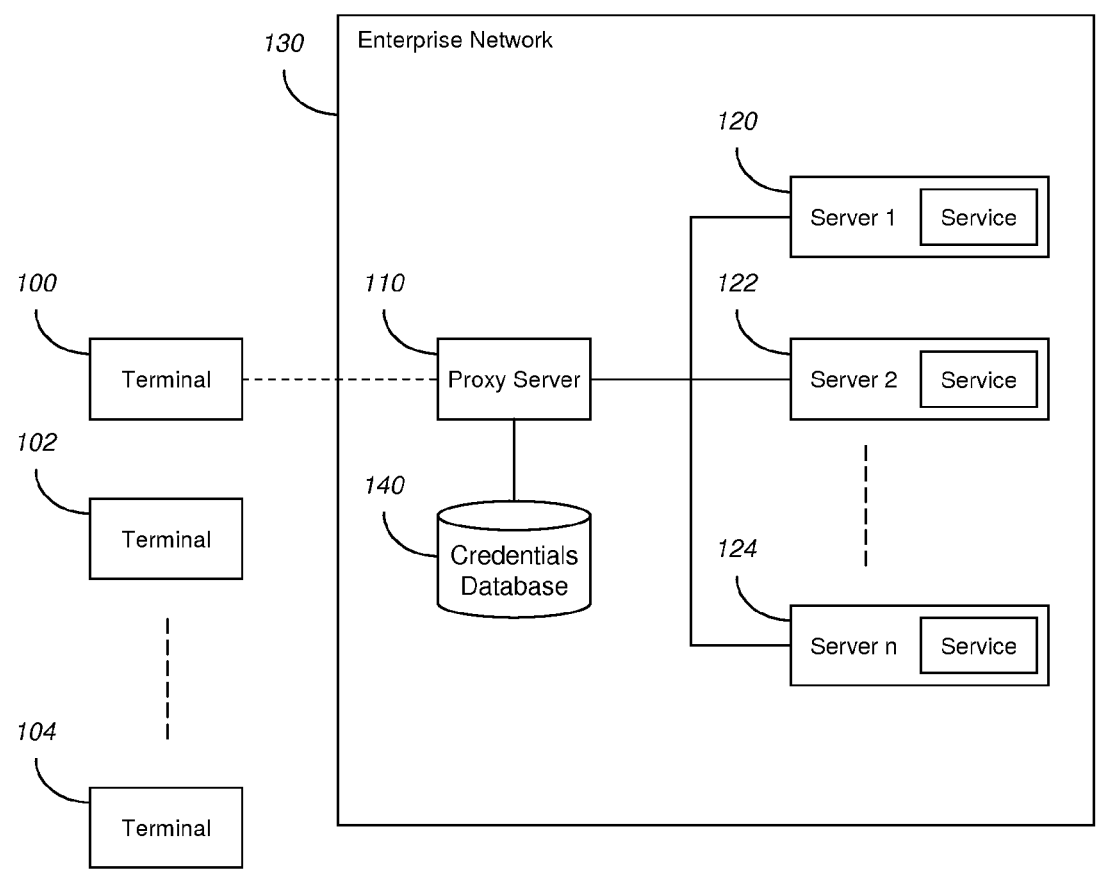
FIG. 1 schematically illustrates the components of a system for providing access credentials associated with a user of a service to a server hosting the service, according to an embodiment.

FIG. 1 schematically illustrates the components of a system for providing access credentials associated with a user of a service to a server hosting the service, according to embodiments of the invention. The system includes a terminal 100 that is used by a user, and which communicates with a proxy server 110. This proxy server 110 also communicates with one or more of a plurality of servers 120-124, each of which may provide a respective service.

The proxy server 110 and the plurality of servers 120-124 may reside within an enterprise network 130. The proxy server 110 may be configured to communicate with each respective server 120-124 via one or more communications networks of the enterprise network 130.

The enterprise network 130 may include a firewall that regulates communications network traffic transmitted to/from the enterprise network 130. The services of the servers 120-124 may thus be provisioned only to members of the enterprise network 130.

As is described in further detail below, the terminal 100 may be a mobile phone, smartphone, a personal digital assistant (PDA), a computer, a server, etc., and may be configured to communicate with other devices via one or more communications networks, which may include the Internet.

When the enterprise network 130 is configured with a firewall, the terminal 100 may not be able to directly initiate data connections with the proxy server 110 or the servers 120-124. Therefore in order to enable the terminal 100 to use the services provided by a server (e.g. 120), relay servers (not shown) may be provided, via which a data connection to the proxy server 110 may be initiated by the terminal 100. As is later described, the proxy server 110 may also initiate a data connection between itself and a server (e.g. 120) so that a communications session may be established between the terminal 100 and the server.

The relay servers may be located outside of the enterprise network 130; however a pinhole in the firewall of the enterprise network 130 may be opened to allow communications sessions to be initiated to the proxy server 110 from the relay servers. A pinhole in the firewall may for example be opened by allowing data connections to the proxy server 110 to be initiated from outside the firewall, provided that those data connections use a pre-defined port of a transport protocol (such as a transport protocol of the Internet Protocol Suite). For example, the pinhole in the firewall may allow data connections to the proxy server 110 that use port 80 of the Transmission Control Protocol (TCP).

A trust relationship may exist between the proxy server 110 and the relay servers such that the relay servers may be the only entities outside of the enterprise network 130 with which the proxy server 110 will communicate directly. This trust relationship may for example be implemented by using a cryptographic protocol (such as Secure Sockets Layer, or Transport Security Layer) for data connections between the proxy server 110 and the relay server.

In addition to providing a mechanism through which a terminal 100 may establish a communications session with a server (e.g. 120) so that the user of the terminal may 100 access the service of that server, embodiments of the invention facilitate the provision of access credentials associated with the user to the server, so that the server can identify the user without the need to prompt the user to enter authentication information.

As is described in further detail below, the proxy server 110 uses authentication credentials to verify the identity of a user that is using a terminal, e.g. when a data connection is established between the client program 220 and the proxy server 110, and then establishes a second data connection with the server 120. The proxy server 110 then bridges the first and second data connections in order to establish a first communications session between the terminal and the server, via which data, in the form of information identifying the user in the manners described below, can be transmitted from the terminal to the server. The proxy server 110 establishes a second communications session with the server, and this second communications session is used to transmit the aforementioned information from the server to the proxy server, which responsively identifies and releases access credentials to the server 120.

The authentication credentials accessible by the proxy server 110 for a user may include one or more secret keys, as described in further detail below.

The access credentials associated with the authentication credentials of a user includes a user identifier. The server 120 is configured to accept this user identifier from the proxy server 110 as confirmation that the user has been authenticated on the basis of a trust relationship between the proxy server and the servers 120-124. This trust relationship may for example be implemented by using a cryptographic protocol (such as Secure Sockets Layer, or Transport Security Layer) for data connections between the proxy server 110 and the servers 120-124, or on the basis that the proxy server 110 and servers 120-124 both reside within the enterprise network 130.

The authentication and access credentials for a plurality of users may be stored by a credentials database 140 within the enterprise network 130. In this case the proxy server 110 communicates with the credentials database 140 in order to access the stored authentication and access credentials. The credentials database 140 may be provided by one or more database servers in the enterprise network 130, or could alternatively be provided by the proxy server 110.

Figure 2:
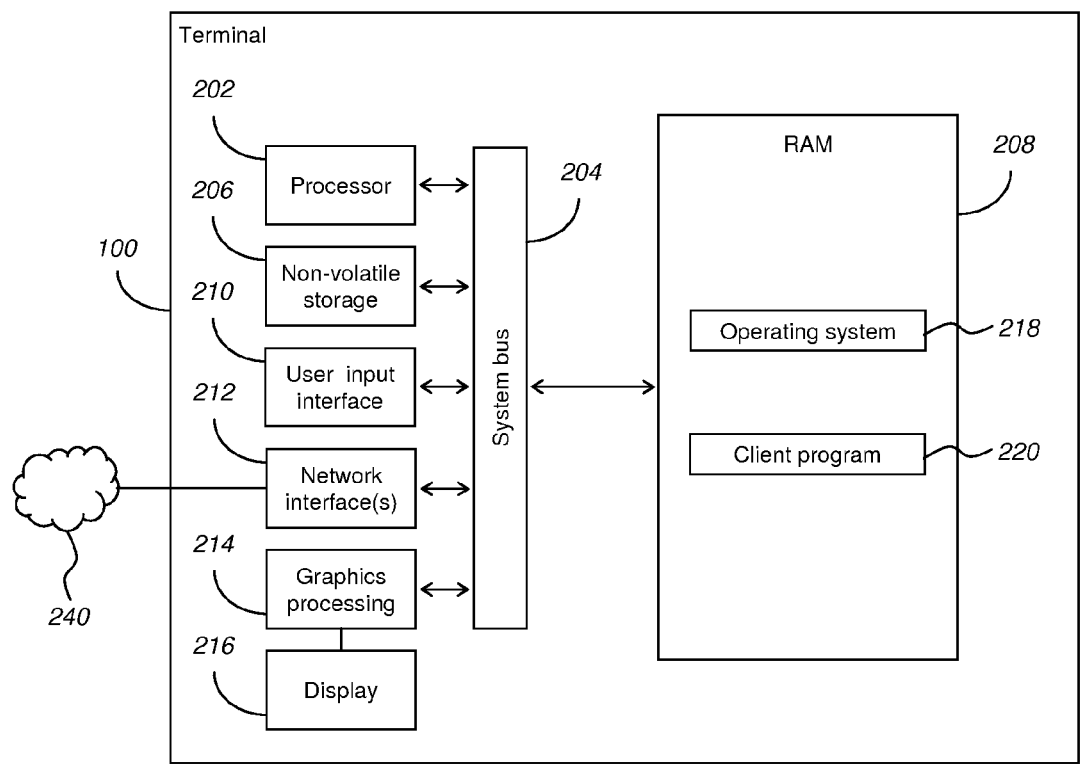
FIG. 2 schematically illustrates exemplary components of a terminal of the system of FIG. 1, according to an embodiment.

FIG. 2 schematically illustrates exemplary components of a terminal 100. As described above the terminal 100 may be a mobile phone, smartphone, a personal digital assistant (PDA), a computer, etc. The terminal 100 includes a processor 202 and components connected to a system bus 204, where these components may include a non-volatile storage device 206, random access memory 208, user input interface 210, network interface 212 and graphics processing component 214.

The network interface 212 (or plurality of such interfaces) of the terminal 100 allows programs running on the processor 202 of the terminal 100 to transmit and receive data to and from a number of other devices and systems via a communications network 240 (or a plurality of such networks).

The network interface 212 (or the plurality of such interfaces) may include a radio access network interface (or a plurality of such interfaces) that is able to communicate with a wireless access node such as a base station or a wireless access point that provides access to a communications network 240 (or a plurality of such networks). The network interface 212 (or plurality of such interfaces) may be able to connect to the wireless access node using one or more of a number of radio access technologies including Global System for Mobile Communications (GSM), Universal Mobile Telecommunications System (UMTS), Long Term Evolution (LTE), fixed wireless access (such as IEEE 802.16 WiMax), and wireless networking (such as IEEE 802.11 WiFi). The communications network 240 and/or wireless access node may also provide access to the Internet. The network interface 212 (or the plurality of such interfaces) may also include a modem and/or an Ethernet card or interface for use with a corresponding communications network (or networks) 240 such as the Internet and/or a private data communications network.

As described in further detail below, the client program 220 of the terminal 100 is configured to use the network interface 212 of the terminal 100 to communicate with the proxy server 110 of the enterprise network 130, in order to access the respective services of the servers 120-124.

In one arrangement the client program 220 is an application that provides a user interface to the user of the terminal 100, and that communicates with the proxy server 110 and accesses the services of the servers 120-124 in response to user input received via the user interface.

In an alternative arrangement the client program 220 is a service and/or an application programming interface that includes functions for communicating with the proxy server 110 and accessing the services of the servers 120-124. In this case these functions of the client program 220 may be used by other programs running on the terminal 100 in order to access the services of the servers 120-124.

The non-volatile storage 206 of the terminal 100 may be used by the client program 220 to store authentication credentials that may be used to identify the user of the terminal 100 to the proxy server 110. These authentication credentials, which are provisioned to the terminal 100 in the manner discussed below, may be stored in an encrypted form in non-volatile storage 206, in order to ensure that the authentication credentials cannot be accessed by an attacker. The authentication credentials stored in non-volatile storage 206 may be encrypted on the basis of a user password. For example the user password, or a hash of the user password, may be used as a key for encrypting the authentication credentials.

In order to be able to identify the user of the terminal 100 to the proxy server 110, the client program 220 may first request that the user enters the user password so that this may be used to decrypt the authentication credentials held in non-volatile storage 206. The user may for example be prompted to enter the user password each time the client program 220 is started. Once the authentication credentials stored in non-volatile storage 220 have been decrypted using the user password entered by the user, they may be held in RAM 208 for the duration of the execution of the client program 220 so that the user need not re-enter the user password until the client program 220 is re-started.

The authentication credentials held for the user may include one or more secret keys that are unique to the user. These secret keys may be generated and provided to the client program 220 as part of an off-line authentication provisioning process.

This authentication provisioning process may be conducted by a control server (not shown) in the enterprise network 130. In one arrangement the authentication provisioning process is initiated when the control server receives a provisioning request (for example, from an administrator of the enterprise network 130) to provision authentication credentials for a new user. This provisioning request may contain information relating to the user, such as a username, email address and/or other contact details relating to the user. The provisioning request may also contain information relating to the terminal 100 for which the authentication provisioning process is to be conducted, such as an network address (e.g. an Internet Protocol address) of the terminal 100, an equipment identity number (e.g. an International Mobile Equipment Identity number), a telephone number (if the device had telephony capabilities), and/or any other type of device identifier that may be used to identify the terminal 100.

Once a provisioning request has been received, the control server generates the one or more secret keys that form the authentication credentials to be provided to the client program 220 of the terminal 100. The generated secret keys may be associated with both the information relating to the user and information relating to the terminal 100 contained in the provisioning request. The secret keys and associated information relating to the user and terminal may also be stored in the credentials database 140, or at least held in such a manner that the keys and associated information are accessible by the proxy server.

The secret keys generated by the control server are then transmitted to the client program 220 of the terminal 100. The secret keys may be encrypted during transmission in order to prevent an attacker from obtaining a copy of the secret keys. Once the secret keys have been received at the terminal 100, they may be encrypted on the basis of a password entered by the user (i.e. the user password) and stored in non-volatile storage 206. As described above this means that the secret keys may then only be accessed by the client program 220 once the user has entered the correct user password.

The authentication provisioning process therefore ensures that a given terminal (e.g. 100) and the credentials database 140 share authentication credentials relating to a user of the enterprise network 130.

As the user password is used to encrypt the authentication credentials stored at the terminal 100 and is shared with the enterprise 130, successful entry of the user password at the terminal 100 enables the user to then be authenticated at any one of servers 120-124 without requiring the user to enter access credentials for a respective service, as is described in further detail below. Embodiments thus enable a single sign on scheme, as the user need only enter the user password when starting the client program (for example) so that the user can then be authenticated to access the services provided by servers 120-124.

Figure 3:
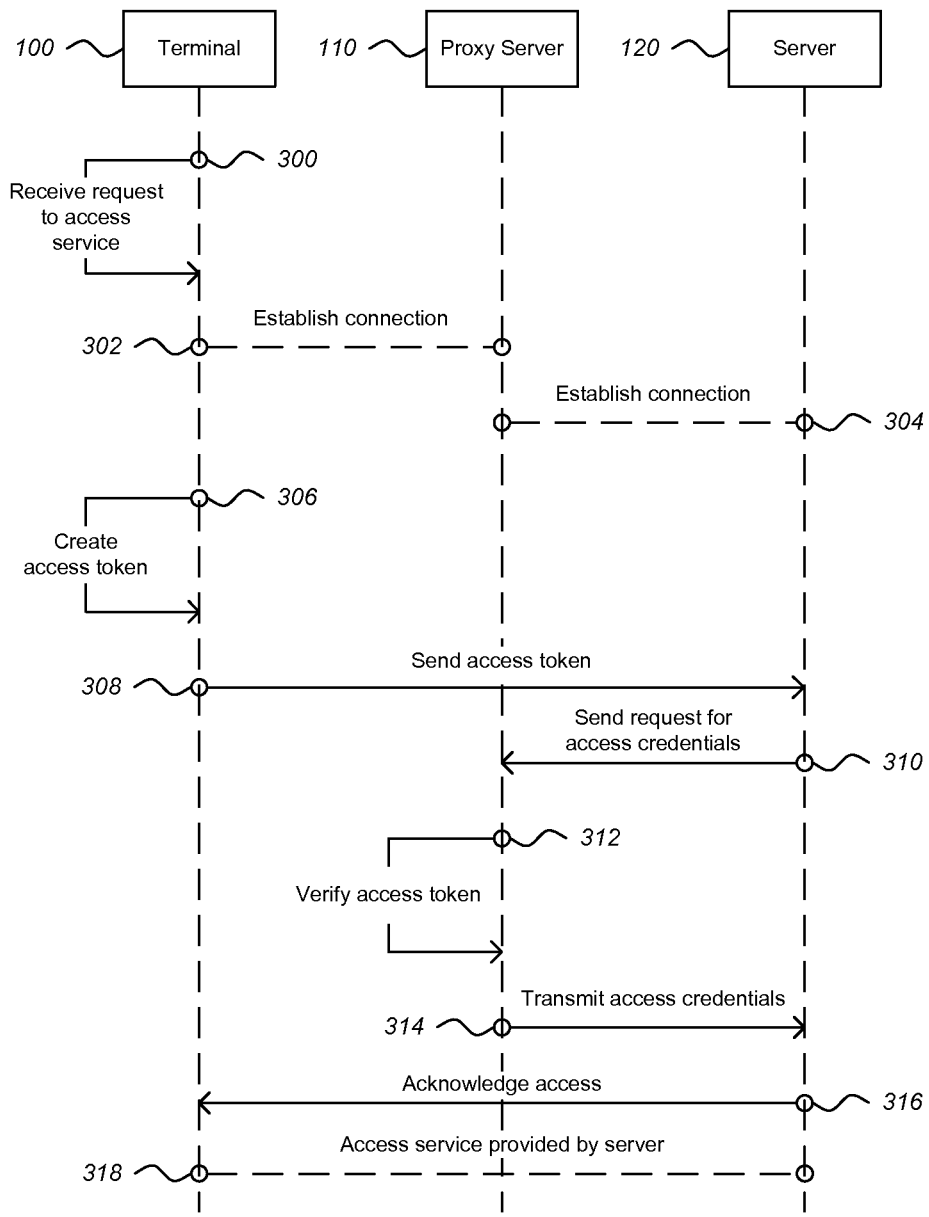
FIG. 3 illustrates steps performed by a terminal, proxy server and server of FIG. 1, according to an embodiment.

The process of providing access credentials for the user of a terminal 100 to a server 120 so that the user can access the service provided by a server 120 will now be described in relation to the steps of FIG. 3 for a first embodiment.

After the client program 220 has been started and the authentication credentials for the user have been decrypted using the user password, the client program 220 of the terminal 100 receives a request to access the service of a given server (step 300). The request may be received as a result of input entered by the user of the terminal 100. Alternatively the request may be received as a result of processing conducted by the client program 220 or as a result of a function call made by another program of the terminal 100 to the client program 220.

In response to the request to access the service of a given server 120, the client program 220 attempts to establish a first data connection with the proxy server 110 (step 302).

The first data connection between the client program 220 (of the terminal 100) and the proxy server 110 may be established via one or more relay servers, in order to circumvent the firewall of the enterprise network 130.

In the event that the one or more relay servers are involved in setting up the first data connection, the client program 220 may initiate the first data connection to the proxy server 110 by transmitting a relay request message to a relay server, thus initiating a relay connection to the relay server. In response to the relay request message the relay server then establishes a relay connection to the proxy server 110 (via zero or more other relay servers, as necessary) thereby enabling data to be transmitted between the client program 220 and the proxy server 110 using the two established relay connections which thus form a first data connection between the client program 220 and the proxy server 110.

The client program 220 then transmits to the proxy server 110 (via the relay server, as appropriate) a connection request message. This connection request message may include information identifying the user of the terminal 100 (such as a username).

The connection request message also includes information relating to the authentication credentials of the user of the terminal 100. This information could for example include one or more of the aforementioned secret keys making up the authentication credentials of the user of the terminal. These secret keys that are transmitted may be encrypted to ensure that an attacker cannot easily access them.

On receipt of the connection request message the proxy server 110 retrieves from the credentials database 140 the authentication credentials held for the user identified in the connection request message, and uses the retrieved authentication credentials to verify the information relating to the authentication credentials in the request message. If the information relating to the authentication credentials is successfully verified, the proxy server 110 accepts the first data connection from the client program 220 of the terminal 100. Otherwise if the information relating to the authentication credentials is not successfully verified the first data connection may not be established, as the proxy server 110 may reject the connection. In this way the first data connection may be established on the basis of the authentication credentials held for the user terminal 100.

Once the first data connection is established, the proxy server 110 establishes a second data connection with the server 120 with which the client program 220 desires to communicate (step 304). The proxy server 110 may for example establish the second data connection in response to a server connection request message received from the client program 220 via the first data connection. Such a server connection request message may include information indicating which server of the plurality of servers 120-124 the proxy server 110 should connect to, e.g. by including a uniform resource identifier (URI) for the desired server.

The proxy server 110 may maintain both the first data connection and the second data connection until one or both of the client program 220 and the server 120 disconnect from the first data connection or second data connection, respectively.

Once the first and second data connections are established, the proxy server 110 then bridges the first and second data connections in order to establish a first communications session between the server 120 and the client program 220 of the terminal 100. The proxy server 110 will then forward data transmitted from the client program 220 via the first data connection to the server 120 via the second data connection, and vice versa.

The client program 220 and server 120 use a first communication protocol to communicate in the first communications session, where the first communications protocol may be any protocol, such as the eXtensible Markup Language Remote Procedure Call (XML-RPC) protocol transported over the HyperText Transfer Protocol (HTTP).

Whilst the first communications session has been established, the server 120 requires that the proxy server 110 provides access credentials relating to the user of the terminal 100 before it will allow the user to access its service via the first communications session.

As described above these access credentials may include the username of the user. Additionally or alternatively these access credentials may include a secure token generated by the credentials database 140 and/or proxy server 110 that the server 120 may decrypt using a key shared between the proxy server 110 and the server. In this case the server 120 may only allow access to its service if it is able to verify the access credentials by successfully decrypting the secure token included in the access credentials.

The proxy server 110 operates independently of the first communications protocol used in the first communications session, and the proxy server 110 thus need not attempt to determine the communications protocol used. As a result, the proxy server 110 is unable to transmit access credentials for the user to the server 120 by interfering with or injecting information into the first communications session.

In order to facilitate the provision of access credentials, a second communications session between the server 120 and proxy server 110 is established via which access credentials are transmitted to the server 120 in response to a suitable request. This request for access credentials includes information received by the server 120 in the first communications session, and which, when relayed onto the proxy server 110 from the server 120, are used by the proxy server 110 in order to identify the access credentials relating to the user that are to be transmitted to the server 120. The steps associated with providing access credentials to the server 120 will now be described in further detail in relation to steps 308 to 318 of FIG. 3.

In order to initiate the provision of access credentials to the server 120, the user terminal 100 creates an access token (step 306). The access token may contain information identifying the user of the terminal 100 (such as a username), and information identifying the server 120. The connection request message may also include a randomly generated number (i.e. a nonce) to ensure that the token is not susceptible to a replay attack.

The access token may also contain information relating to the afore-mentioned authentication credentials of the user of the terminal 100, such as a message authentication code that is keyed using the authentication credentials of the user of the terminal 100. For example, the message authentication code may be a hash of the other contents of the access token besides the message authentication code itself (e.g. a hash of the information identifying the user and the server), where the key of the hash is one of the secret keys in the authentication credentials of the user of the terminal 100.

The client program 220 then transmits the access token to the server 120 in the first communications session (step 308). The access token may for example be transmitted in a credentials transmission message of the first communications protocol, which, as described above, cannot be accessed by the proxy server 110.

That being the case, in response to receiving the access token in the first communications session, the server 120 transmits a request for access credentials to the proxy server 110, via a second communications session established by the server 120 with the proxy server 110 (step 310). This second communications session uses a second communications protocol, which is different than the first communications protocol and is a pre-determined protocol that the proxy server 110 is configured to use, in contrast to the first communication protocol.

The request for access credentials transmitted by the server 120 to the proxy server 110 may contain the access token transmitted to the server 120 by the client program 220 in the first communications session. In response to receiving the request for access credentials, the proxy server 110 verifies the access token (step 312); in one arrangement this involves retrieving from the credentials database 140 the authentication credentials held for the user identified in the access token. The proxy server 110 may calculate a checking code using the retrieved authentication credentials, e.g. by hashing the contents of the access token besides the message authentication code, where the key of the hash is one of the secret keys in the retrieved authentication credentials of the user of the terminal 100. If the message authentication code in the received access token and the checking code match, the message authentication code (and thus access token) is successfully verified: the proxy server 110 identifies and retrieves the access credentials associated with the authentication credentials of the user held in the proxy credentials database 140. The proxy server 110 then transmits the retrieved access credentials to the server 120 using the second communications session (step 314).

In response to receiving the access credentials the server 120 allows the client program access to its service via the first communications session. The server 120 may, for example, transmit an acknowledgement message to the client program of the terminal 100 in order to indicate that access has been granted (step 316).

The client program 110 of the terminal 100 is thereafter able to communicate with the server 120 using the first communications protocol in order to access the service provided by the server (step 318). As noted above, the server 120 may provide a service that is specific to the user of the terminal identified by the access credentials (i.e. the user of terminal 100), for example it may provide access to files, emails, calendar entries, and/or other information and/or services specific to that user.

If in step 312 the message authentication code of the access token is not successfully verified the proxy server 110 may transmit verification failed information to the server 120 using the second communications protocol. In response to receiving verification failed information the server 120 may then disconnect from the first communications session.

The proxy server 110 thus operates at the transport layer in respect of the first communications session: simply bridging the first and second data connections; and at the application layer in respect of the second communications session: verifying the authentication credentials it receives from the server 120 so that access credentials for the user of the terminal 100 can be provided to the server 120. The server 120 may then allow the client program 220 to access the service it provides, via the first communications session.

By configuring the second communications session separately from the first communications session, the embodiment ensures that the first communications session between the terminal 100 and server 120 may be conducted according to any communications protocol agreed between these endpoints and without the involvement of the proxy server 110.

Figure 4:
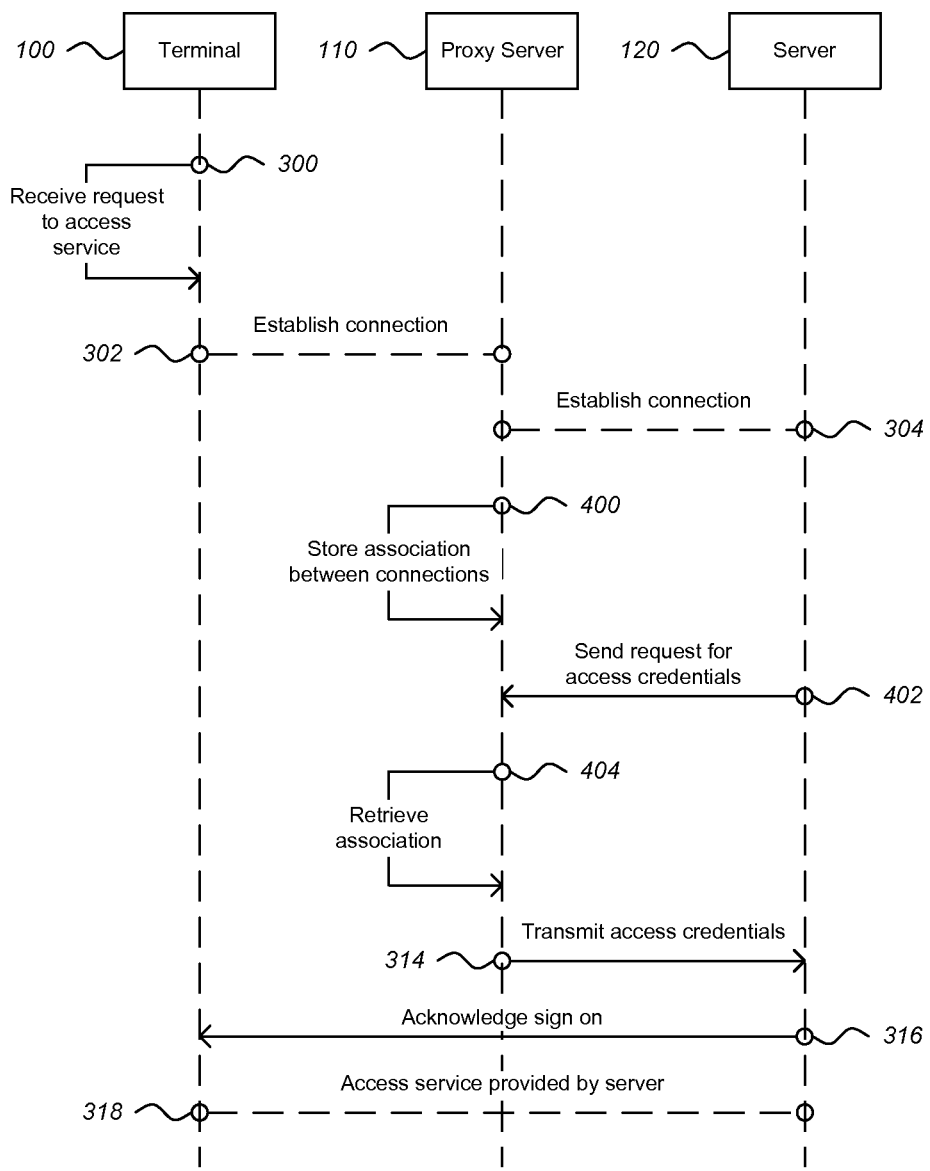
FIG. 4 illustrates steps performed by a terminal, proxy server and server of FIG. 1, according to an embodiment.

A second embodiment will now be described with reference to FIG. 4. In the second embodiment a terminal 100 may be used to access the services provided by a server 120-124 of the enterprise network 130, as in the first embodiment. With brief reference to FIG. 3, the second embodiment starts with steps 300-304, as for the first embodiment, but once the first and second data connections have been established at step 304 the proxy server 110 stores an association between the first and second data connections (step 400). The association between the first and second data connections may include information relating to the respective ports used by the proxy server 110 for the first and second data connections, and may also be associated with information identifying the authentication credentials on the basis of which the first data connection was established in step 302, i.e. the authentication credentials provided by the client program 220 in order to identify the user of the terminal 100 to the proxy server 110.

The association may be stored in RAM and/or in non-volatile storage 206 at the proxy server 110. The association may be removed from RAM and/or non-volatile storage 206 when the first and/or second data connection is terminated.

As in the first embodiment the proxy server 110 is not capable of determining the first communications protocol used in the first communications session, and is thus not able to provide access credentials to the server 120 by interfering with or injecting information into the first communications session.

That being the case, in response to the establishment of the second data connection the server 120 transmits a request for access credentials to the proxy server 110 via a second communications session established with the proxy server 110 (step 402). As for the first embodiment this second communications sessions uses a second communications protocol, which is different to the first communications protocol used in the first communications session. The second communications protocol may be a pre-determined protocol that the proxy server 110 is configured to use, in contrast to the first communication protocol.

Once the second communications protocol is established with the proxy server 110, the server 120 transmits the request for access credentials thereto. The request for access credentials may contain a data connection identifier that comprises information relating to the second data connection. In this way, information received in the first communications session by the server 120 is transmitted to the proxy server 110 in the second communications session.

This information may be gathered from the second data connection by the server 120. For example, the data connection identifier may contain information relating to the port used by the proxy server 110 for the second data connection, where this information is gathered by the server 120 examining packets of data it receives in the second data connection.

In response to receiving the request for access credentials from the server 120, the proxy server 110 retrieves the stored association relating to the data connection identified by the data connection identifier included in the request for access credentials (step 404).

As described above the stored association between the first and second data connections may be associated with information identifying the authentication credentials on the basis of which the first data connection was established. The proxy server 110 thus identifies and retrieves from the credentials database 140 the access credentials that are associated with these identified authentication credentials.

Turning back to FIG. 3, the proxy server 110 then transmits the retrieved access credentials to the server 120 using the second communications session, as in the first embodiment (step 314).

The server 120 may transmit an acknowledgement message to the client program of the terminal 100 in order to indicate that access has been granted, as in the first embodiment (step 316).

The client program 110 of the terminal 100 may then communicate with the server 120 using the first communications protocol in order to access the service provided by the server 120, as in the first embodiment (step 318).

If in step 404 the proxy server 110 is unable to retrieve an association on the basis of the data connection information received in step 402 (for example because one or both of the first and second data connection have disconnected, and the association has been removed as a result), the proxy server 110 may transmit a "verification failed" notification to the server 120 using the second communications protocol. In response to receiving this notification the server 120 may then disconnect from the first communications session (if it has not already disconnected).

Thus, in the second embodiment the proxy server 110 identifies the stored association between the first and second data connections on the basis of a data connection identifier transmitted by the server 120 to the proxy server 110 in the request for access credentials relating to the user. Hence information received in the first communications session by the server 120 is transmitted to the proxy server 110 in the request for access credentials, and this information is used to identify the access credentials to be transmitted to the server 120, as in the first embodiment. However, the second embodiment differs from the first embodiment in that the terminal 100 need not transmit information relating to the authentication credentials of the user (e.g. an access token) to the server 120. Instead the proxy server 110 is able to provide access credentials to the server 120 on the basis of a stored association between the first and second data connections, and on the basis of a data connection identifier transmitted by the server 120 to the proxy server 110. In this way authentication credentials need only be transmitted by the client program once (when establishing the first data connection) in order to establish the first communications session.

A third embodiment will now be described, which accommodates a scenario in which a user accesses the servers 120-124 from a plurality of terminals, each of which is configured with the same username and password, and enables the user to change the password at any said terminal.

While the user can access servers 120-124 from a plurality of terminals, the control server of the enterprise network 130 typically provisions each said terminal with a different set of authentication credentials. Each set of authentication credentials stored in the credentials database 140 is thus associated with a particular user and with a particular terminal, e.g. 100-104, of that user. Further, different access credentials may be stored and associated with each set of authentication credentials in the credentials database 140, thereby allowing each user to simultaneously access respective services provided by the servers 120-124 using the plurality of terminals with which a given user is associated.

Figure 5:
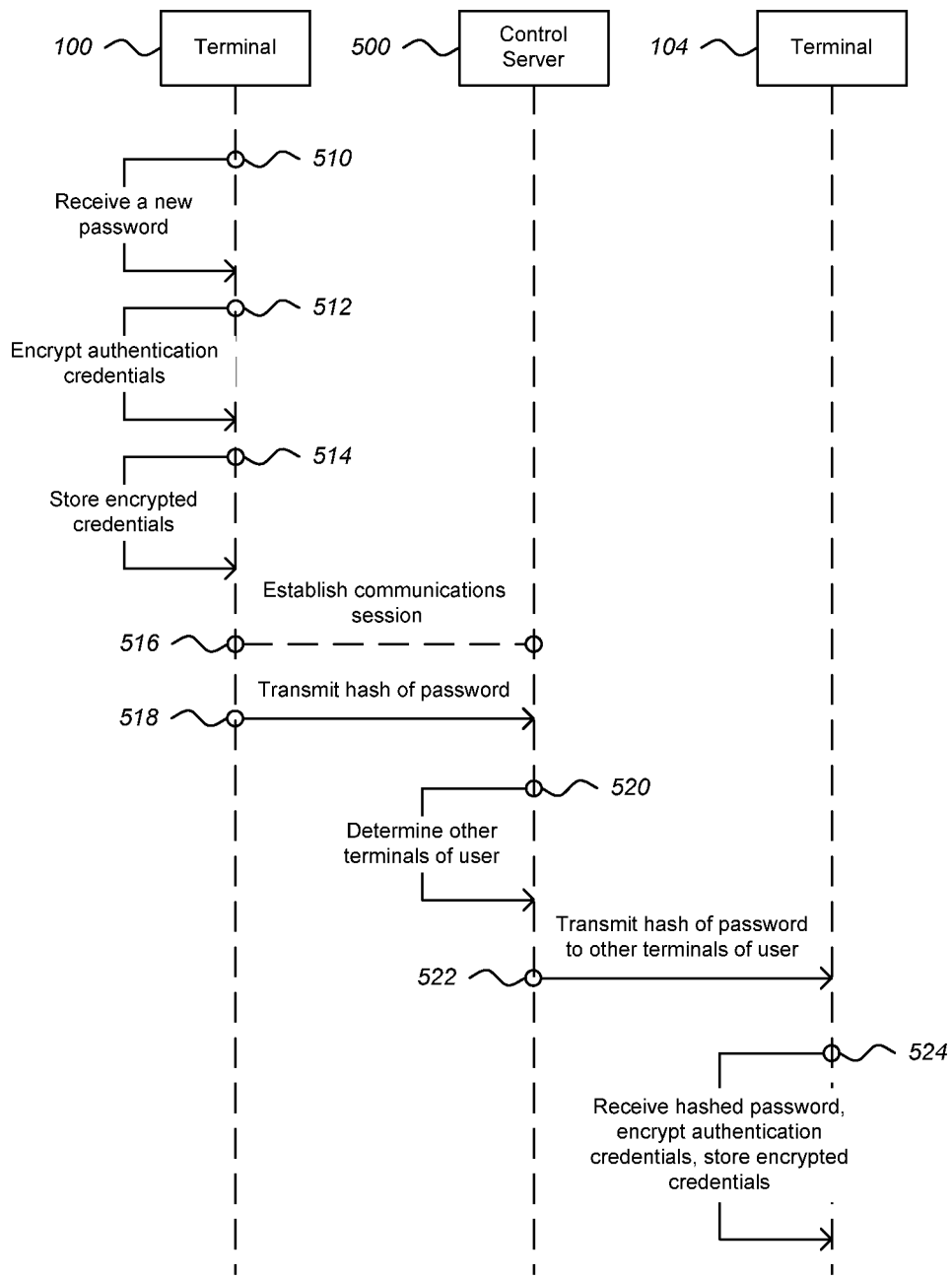
FIG. 5 illustrates steps performed by a first terminal, control server and second terminal of FIG. 1, according to an embodiment.

In the third embodiment, when a user changes the user password at one of the terminals, the change to the user password may be effected at the other terminals with which the user is associated according to a process described with reference to FIG. 5.

After the client program 220 has been started and the authentication credentials for the user have been decrypted using the user password, the user may choose to enter a new user password, for example by selecting a 'change user password' option in the user interface provided by the client program 220.

The client program 220 of the terminal 100 then receives a new user password, e.g. by the user entering the new password in the user interface provided by the client program 220 (step 510).

In response to receiving the new password, the client program 220 uses the new user password to encrypt the decrypted authentication credentials of the user of the terminal 100 that are currently held in RAM 140 (step 512).

To encrypt the authentication credentials of the user of the terminal using the new user password, the client program 220 may compute a hash of the new password, and may use the hash of the new password as a key for encrypting the authentication credentials of the user.

The client program 220 then stores the authentication credentials encrypted using the new password in step 512 in non-volatile storage 206 at the terminal 100, replacing the authentication credentials encrypted using the user's previous user password that were previously stored in non-volatile storage 206 (step 514). If the client program 220 is restarted, the user will need to enter the new user password so that the client program 220 can decrypt the encrypted authentication credentials held in non volatile storage 206 at the terminal 100.

The client program 220 of the terminal 100 then establishes a first communications session with the control server 500 of the enterprise network 130 (step 516). The control server 500 may be one of the servers 120-124 of the enterprise network 130 with which the client program 220 may establish communications sessions via the proxy server 110, e.g. according to the steps of the first or second embodiment.

Once the client program 220 of the terminal 100 has established a first communications session with the control server 500 and the control server 500 has verified the access credentials forwarded by the proxy server 210 in the manner described above, the client program 220 may transmit to the control server 500 a password change message via the first communications session (step 518). The password change message may contain a hash of the new user password received in step 510.

In response to receiving the password change message, the control server 500 determines information identifying each of the other terminals with which the user of terminal 100 is associated (step 520), for example by accessing the credentials database 140. Alternatively the control server 500 may establish a communications session with the proxy server 110 and retrieve this information directly from the proxy server 110.

Once the control server 500 has received data identifying the other terminals, the control server 500 transmits a hash of the new user password received in the password change message to each of the other terminals, e.g. terminal 104 (step 522). To the extent that they exist, the control server 500 may use existing communications sessions between itself and each other terminal to transmit the hash of the new user password (for example via communications sessions established via the first or second embodiment). Alternatively, in the event that one or some of the other terminals maintain a respective data connection with one or more of the relay servers, the control server 500 may utilise these connections by requesting that the proxy server 110 transmit the hash of the new user password to each other terminal. Alternatively other mechanisms for transmitting a push notification to a terminal may be used to transmit the hash of the new user password to each other terminal, such as described in U.S. patent application Ser. No. 13/025,984 entitled Method, apparatus and system for provisioning a push notification session filed on Feb. 11, 2011, hereby incorporated herein by reference.

In response to receiving the hash of the new user password, the client programs of each of the other terminals may perform steps corresponding to steps 510 to 514, as is now described for one of these other terminals 104 (step 524).

The client program of terminal 104 first receives the hash of the new user password. In response to receiving the hash of the new password, the client program of terminal 104 uses the hash of the new user password to encrypt the decrypted authentication credentials of the user that are currently held in RAM. For example, the client program of terminal 104 may use the hash of the new user password as a key for encrypting the authentication credentials of the user.

The client program of terminal 104 then stores the authentication credentials encrypted using the new user password in non-volatile storage at the terminal 104, replacing the authentication credentials encrypted using the user's previous user password that were previously stored in non-volatile storage. If the client program of terminal 104 is restarted, the user will then need to enter the new user password so that the client program can decrypt the encrypted authentication credentials held in non volatile storage at terminal 104.

Thus this embodiment allows for the proxy server 110 and control server 500 to assist in ensuring that each of the terminals with which the user is associated may be configured to use the same new user password to encrypt the authentication credentials stored for the user at each terminal.

As described above, the first and second embodiments enable a single sign on scheme, as successful entry of the user password at the terminal 100 enables the user to then be authenticated at the servers 120-124. Changing the user password at a first terminal, e.g. 100, ensures that any person with knowledge of the user password can no longer use that terminal to gain access to the services of servers 120-124. However, such persons may still be able to use another of the terminals associated with the user if the user password on any of the other terminals is the same as the user password on the first terminal.

The third embodiment thus builds upon the single sign on scheme of the first and second embodiments by ensuring that the user password for a given user is the same on all terminals associated with that user, even when the user password is changed at one of the terminals. As a result anyone who may have gained knowledge of the old user password on any of the terminals associated with the user will no longer be able to access the services of the servers 120-124 after the user password is changed at any of the terminals associated with the user.

The above embodiments are to be understood as illustrative examples of the invention. Further embodiments of the invention are envisaged as follows.

In an alternative to any embodiment, the proxy server 110, plurality of servers 120 to 124 and relay servers may be configured to establish a plurality of communications sessions between a plurality different terminal devices e.g. 100-104, and the plurality of servers 120-124, in order to allow the respective users of those terminals to use the services of the servers 120-124.

In an alternative to the first embodiment, the message authentication code in the access token created by the terminal 100 in step 306 may be a hash of the other contents of the access token besides the message authentication code itself and of a first set of one or more secret keys in the authentication credentials of the user terminal 100. For example, the message authentication code may be a hash of the information identifying the user and the server and of the first set of one or more secret keys. In this case, the key of the hash is a second set of one more secret keys in the authentication credentials of the user of the terminal 100. In step 312, given the first set of one or more secret keys in the retrieved authentication credentials and the other contents of the access token besides the message authentication code, the proxy server may verify using the second set of one more secret keys in the retrieved authentication credentials that the message authentication code in the access token is correct.

In an alternative to any embodiment, no relay servers may be provided, and the terminal 100 may be configured to establish a first data connection with the proxy server 110 directly, via a pinhole in the firewall of the enterprise network 130.

In an alternative to any embodiment, the proxy server 110 may be configured to initiate a data connection with a relay server, in order to circumvent the firewall of the enterprise network 130 when establishing a first data connection between a terminal 100 and the proxy server 110. In this case there may not be a pinhole in the firewall of the enterprise network 130. The proxy server 110 may initiate the data connection with a relay server in response to a relay connection request message transmitted from the relay server to the proxy server 110 via a pre-established data connection. This pre-established data connection may be initiated by the proxy server 110 to the relay server, e.g. when the proxy server 110 starts up, and may be re-established by the proxy server 110 if the pre-established data connection is lost.

In an alternative to the second embodiment, in step 400 the stored association between the first and second data connections may include information relating to the Internet Protocol address and port used by the terminal 100 for the first data connection. The request for access credentials transmitted by the server 120 in step 402 may contain a data connection identifier that contains information relating to one or more features of the first data connection. The information relating to one or more features of the first data connection may be gathered from the first communications session by the server 120. For example, the data connection identifier may contain information relating to the Internet Protocol address and port used by the terminal 100 for the first data connection, where this information is gathered from the first communications session by the server 120 examining information exchanged in the first communications protocol via the first communications session. In step 404, the proxy server 110 may then retrieve the stored association relating to the data connection identified by the data connection identifier included in the request for access credentials.

In an alternative to the second embodiment, in step 400 the stored association between the first and second data connections may include information relating to the Internet Protocol address and port used by the server 120 for the second data connection. The request for access credentials transmitted by the server 120 in step 402 may contain a data connection identifier that contains information relating to one or more features of the second data connection. The information relating to one or more features of the second data connection may be gathered from the second data connection by the server 120. For example, the data connection identifier may contain information relating to the Internet Protocol address and port used by the server 120 for the second data connection, where this information is gathered from the second data connection by the server 120. In step 404, the proxy server 110 may then retrieve the stored association relating to the data connection identified by the data connection identifier included in the request for access credentials.

In an alternative to the third embodiment, the terminal 100 may be configured to establish respective communications sessions with each other terminal with which the user of terminal 100 is associated. The terminal 100 may then transmit the hash of the new user password directly to each other terminal via the respective communications sessions. In order to establish the respective communications sessions, the terminal 100 may first retrieve address information relating to the other terminals with which the user of terminal 100 is associated by establishing a first communications session with the proxy server 110 or control server, in accordance with either the first or second embodiment.

In an alternative to any embodiment, the client program 220 may be accessed by the user via a second terminal. In one arrangement, in order to allow the user to use the client program 220 the client program 220 provides a user interface that can be accessed by the user via the second terminal, for example the user interface may be provided to the second terminal in the form of one or more dynamic web pages and/or a remote desktop that may be displayed to the user by the second terminal. In an alternative arrangement the client program 220 provides remote procedures that can be accessed by a second client program on the second terminal, where for example the remote procedures are called by the second client program whilst that program displays a corresponding user interface to the user.

In an alternative to any embodiment, the access credentials associated with the authentication credentials of a user that are transmitted to a server 120-124 by the proxy server 110 includes a user identifier and a secure token generated by the credentials database 140 and/or proxy server 110. A server e.g. 120 is configured to decrypt this secure token in access credentials it receives from the proxy server 110 by using a key shared between the proxy server 110 and the server 120, in order to verify that the access credentials have been generated by the proxy server 110 (and not an attacker). If the secure token is successfully verified the server 120 is configured to accept the user identifier in the access credentials as confirmation that the user has been authenticated.

In an alternative to any embodiment, in the authentication provisioning process the secret keys generated by the control server (that form the authentication credentials for a new user) are provided to the client program 220 of the terminal 100 in the following manner. A single use key is generated and stored by the control server, and this single use key is also sent to the user via email. Once the user has received this email, the user then enters the single use key into the client program 220 of the terminal 100. The client program 220 of the terminal 100 then uses the single use key entered by the user to sign and validate a series of key exchange messages sent between it and the control server. These key exchange messages are used to negotiate the secure transmission of the secret keys that form the authentication credentials for the user to the client program 220 of the terminal 100. Once the authentication credentials have been provided to the client program 220 of the terminal 100 in this way the single use key is invalidated.

The terminals 100-104, proxy server 110, servers 120-124, relay servers and control server of the above embodiments may be configured to operate according to the above embodiments by executing computer programs held in computer readable media. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of providing access credentials associated with a user of a first terminal to a service server comprising a service, the method comprising:
    receiving, at a proxy server, from the first terminal, a request to establish a first data connection, the request including user identification data;
    identifying, at the proxy server, authentication credentials associated with the user of the first terminal;
    verifying, at the proxy server, the received user identification data based on the identified authentication credentials associated with the user of the first terminal;
    establishing, at the proxy server, the first data connection with the first terminal based on verifying the received user identification data;
    establishing, at the proxy server, a second data connection with the service server after verifying the received user identification data;
    bridging, at the proxy server, the first data connection and the second data connection in order to establish a first communications session using a first communications protocol between the first terminal and the service server;
    establishing, at the proxy server, a second communications session using a second communications protocol between the proxy server and the service server;
    receiving, at the proxy server from the service server, via the second communications session, a request for access credentials associated with the user, the request including information received by the service server via the first communications session, wherein the access credentials associated with the user are different from the user identification data;
    identifying, at the proxy server, the access credentials associated with the user based on the information received by the service server; and
    transmitting, from the proxy server to the service server, the identified access credentials via the second communications session.

2. The method according to claim 1, wherein the second communications protocol is not used in the first communications session.

3. The method according to claim 2, wherein the user identification data received by the service server includes a message authentication code generated using the authentication credentials associated with the user of the first terminal.

4. The method according to claim 1, the method further comprising:
    storing, at the proxy server, an association between the first data connection and the second data connection
    wherein the information received by the service server comprises a data connection identifier configured to identify the stored association between the first data connection and the second data connection.

5. The method according to claim 4, wherein the stored association identifies a first communications port of the proxy server used to establish the first data connection and a second communications port at the proxy server used to establish the second data connection.

6. The method according to claim 1, wherein the identified authentication credentials comprise a secret key associated with the user and the first terminal.

7. The method according to claim 1, wherein the user identification data comprises one of a username associated with the user or a secret key associated with the user.

8. The method according to claim 1, further comprising:
receiving, at the proxy server, via the first data connection, a service server connection request from the first terminanl,
wherein the server connection request comprises a service access request, and wherein the requested service requires the access credentials associated with the user in order to enable the first terminal to access the service.

9. The method according to claim 1, wherein the first data connection is established between the first terminal and the proxy server separated by a firewall, and wherein the first data connection is established via one or more relay servers enabling the establishment of the first data connection via the firewall.

10. The method according to claim 1, the method further comprising:
receiving, at the proxy server, a hash associated with a new password entered at the first terminal;
identifying, at the proxy server, a second terminal associated with the user of the first terminal based on the received hash;
transmitting, from the proxy server to the second terminal, the received hash of the new password,
wherein the hash of the new password is configured to be used by the second terminal to encrypt authentication credentials.

11. The method according to claim 10, the method further comprising: receiving, at the proxy server, a request for data identifying the second terminal.

12. The method according to claim 1, the method further comprising: verifying, at the proxy server, the information received by the service server from the first terminal based on the identified authentication credentials stored at the proxy server and associated with the user of the first terminal.

13. The method according to claim 1, wherein the information received by the service server from the first terminal comprises an access token.

14. A system comprising:
at least one processor; and
at least one memory including computer-executable code and authentication credentials, wherein the processor is configured to execute the computer-executable code and cause the system to:
receive, from a terminal, a request to establish a first data connection, the request including user identification data;
identify authentication credentials associated with the user of the terminal;
verify the received user identification data based on the identified authentication credentials associated with the user of the terminal;
establish the first data connection with the terminal based on verifying the received user identification data;
establish a second data connection with a service server after verifying the received user identification data;
bridge the first data connection and the second data connection in order to establish a first communications session using a first communications protocol between the terminal and the service server;
establish a second communications session using a second communications protocol with the service server;
receive, from the service server, via the second communications session, a request for access credentials associated with the user, the request including information received by the service server via the first communications session, wherein the access credentials associated with the user are different from the user identification data;
identify the access credentials based on the information received by the service server; and
transmit to the service server the identified access credentials via the second communications session.

15. The system according to claim 14, wherein the second communications protocol is not used in the first communications session.

16. The system according to claim 15, wherein the user identification data received by the service server includes a message authentication code generated using the authentication credentials associated with the user of the terminal.

17. The system according to claim 14, wherein the processor is configured to execute the computer-executable code and further cause the system to:
store an association between the first data connection and the second data connection,
wherein the information received by the service server comprises a data connection identifier configured to identify the stored association between the first data connection and the second data connections.

18. The system according to claim 17, wherein the stored association identifies a first communications port used to establish the first data connection and a second communications port used to establish the second data connection.

19. The system according to claim 14, wherein the processor is configured to execute the computer-executable code and further cause the system to: verify the information received by the service server from the terminal based on the identified authentication credentials associated with the user of the terminal.

20. A proxy server for providing access credentials associated with a user of terminal to a service server, the proxy server comprising a processing system and a communications interface, wherein the proxy server is configured to:
receive, from a terminal, via the communications interface, a request to establish a first data connection, the request including user identification data;
identify authentication credentials associated with the user of the terminal;
verify the received user identification data based on the identified authentication credentials associated with the user of the terminal
establish the first data connection with the terminal via the communications interface based on verifying the received user identification data;
establish a second data connection with the service server via the communications interface after verifying the received user identification data;
bridge the first data connection and the second data connection in order to establish a first communications session using a first communications protocol between the terminal and the service server;
establish a second communications session using a second communications protocol with the service server via the communications interface;
receive, from the service server, via the communications interface, via the second communications session, a request for access credentials associated with the user, the request including information received by the service server via the first communications session, wherein the access credentials associated with the user are different from the user identification data;

identify the access credentials based on the information received from the service server; and transmit, to the service server via the communications interface, the identified access credentials via the second communications session.

21. A computer program product comprising a non-transitory, computer-readable storage medium having computer readable instructions stored thereon, the computer readable instructions being executable by a proxy server to cause the proxy server to perform a method of providing access to credentials associated with a user of a terminal to a service server hosting a service, the method comprising:

receiving, at the proxy server, from the terminal, a request to establish a first data connection, the request including user identification data;

identifying, at the proxy server, authentication credentials associated with the user of the terminal;

verifying, at the proxy server, the received user identification data based on the identified authentication credentials associated with the user of the terminal;

establishing, at the proxy server, the first data connection with the terminal based on verifying the received user identification data;

establishing, at the proxy server, a second data connection with the service server after verifying the received user identification data;

bridging, at the proxy server, the first data connection and the second data connection in order to establish a first communications session using a first communications protocol between the terminal and the service server;

establishing, at the proxy server, a second communications session using a second communications protocol between the proxy server and the service server;

receiving, at the proxy server from the service server, via the second communications session, a request for access credentials associated with the user, the request including information received by the service server via the first communications session, wherein the access credentials associated with the user are different from the user identification data;

identifying, at the proxy server, the access credentials associated with the user based on the information received by the service server; and transmitting, from the proxy server to the service server, the identified access credentials via the second communications session.

22. The computer program product of claim 21, wherein the user identification data comprises one of a username associated with the user or a secret key associated with the user.

23. The computer program product of claim 21, wherein the information received by the service server comprises an access token.

* * * * *